(No Model.)
E. P. & H. C. WALTER.
FRICTION CLUTCH.
No. 329,244. Patented Oct. 27, 1885.
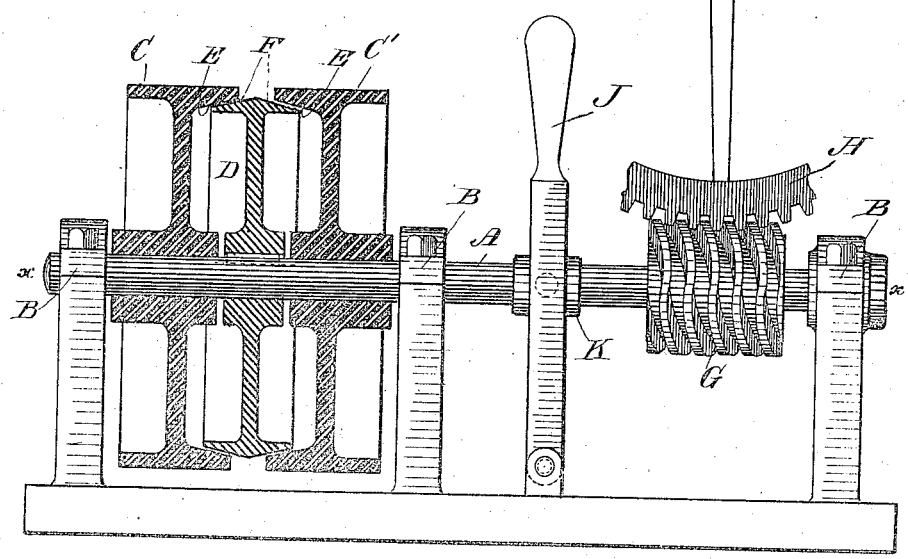
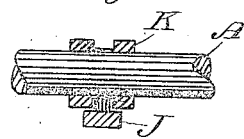
Witnesses
S. Williamson
H. T. Stephens.
Inventors
Edward P. Walter
Henry C. Walter
By Smith & Hubbard
Attys.

UNITED STATES PATENT OFFICE.

EDWARD P. WALTER AND HENRY C. WALTER, OF BRIDGEPORT, CONN.

FRICTION-CLUTCH.

SPECIFICATION forming part of Letters Patent No. 329,244, dated October 27, 1885.

Application filed June 10, 1884. Renewed September 29, 1885. Serial No. 178,552. (No model.)

*To all whom it may concern:*

Be it known that we, EDWARD P. WALTER and HENRY C. WALTER, citizens of the United States, residing at Bridgeport, in the county of Fairfield and State of Connecticut, have invented certain new and useful Improvements in Friction-Clutches; and we do hereby declare the following to be a full, clear, and exact description of the invention, such as will enable others skilled in the art to which it appertains to make and use the same.

Our invention relates to certain novel and useful improvements in friction-clutches, and has for its object to provide a device of this description whereby power may be transmitted with great facility and positiveness, and, furthermore, to greatly simplify the construction and application of these devices; and with these ends in view our invention consists in the details of construction and combination of elements hereinafter fully and in detail explained, and then specifically designated by the claims.

In order that those skilled in the art to which our invention appertains may more fully understand its construction and operation, we will proceed to describe the same in detail, referring by letter to the accompanying drawings, forming a part of this specification, in which—

Figure 1 shows a side elevation of our improvement with the pulleys in section, and Fig. 2 a detail section taken at the line $x$ $x$ of Fig. 1.

Similar letters denote like parts in the several figures of the drawings.

It is not deemed necessary to show or describe any particular machine in connection with our improvement, as the latter is applicable to machines of various descriptions, and we have shown, therefore, only the primary means by which we apply our improvement directly.

A is a shaft journaled in any ordinary manner within bearings B, so as to have a free longitudinal play therein.

C C' are loose pulleys mounted on said shaft, and D is a tight pulley arranged between the loose pulleys, and keyed or otherwise rigidly secured on the shaft. The lower faces of the inside rims of these loose pulleys are inclined or beveled, as seen at E, and the outer face of the tight pulley is beveled from the center downward to the edges of the rims, as seen at F, so that it will be readily understood that the face of the tight pulley, where the latter is thrown against either of the loose pulleys, will bind against its beveled rim and lock the two pulleys by friction, for the purpose presently explained.

G is a worm mounted on the shaft A, and engaging with a gear-wheel, H, mounted on the shaft I, which latter is the primary or power shaft of the machine, which may be actuated by our improvement.

J is a hand-lever, which is attached to the collar K, as shown at Fig. 2, or in any other suitable manner. This collar is rigidly secured on the shaft A.

The operation of our improvement is as follows: Belts running in opposite directions are dlaced over the pulleys C C'. By throwing the lever away from the pulleys the pulley D is caused to bind against the pulley C', and motion will be communicated to the tight pulley, thereby causing the thread of the worm to travel along the teeth of the wheel H after the manner of a screw, and this will tend to give the shaft a still further longitudinal throw and make the frictional contact between the tight and loose pulleys greater. If the work to be accomplished by the revolution of the shaft I is increased, and the initial action of the worm is insufficient to turn the wheel H, then the worm will travel forward, as previously set forth, until a resistance is met with, which resistance is the binding of the tight pulley against the loose pulley with a bite sufficient to enable the latter to overcome by friction the opposition offered by the wheel to the further movement of the worm. It will be readily understood that the greater the work to be accomplished the closer will be the frictional contact between the tight and loose pulleys, and therefore the greater will be the power transmitted from the driving-belt. If the work is increased during the operation of our improvement, the speed of the wheel will be decreased, while that of the worm will remain comparatively the same, and this will cause the latter to travel longitudinally until the friction between the tight and loose pulleys is great enough to overcome the resistance offered by the extra work and cause the relative speed of said worm and wheel to be in the same proportions as it was before the work was increased. By throwing the lever back in a vertical position all frictional contact between the pulleys ceases, and the shaft A will be stationary. By throwing the lever toward the pulleys the tight pulley will be bound against the pulley C, and the shaft will then revolve in a direction opposite to that previously described, with similar results.

In machines of certain descriptions it becomes necessary to substitute for the wheel H an elongated nut adapted to reciprocate longitudinally, in which case the worm travels in said nut after the manner of a screw, and operates the same in substantially the same manner as the wheel.

We do not wish to limit ourselves to the exact manner shown of adapting the pulleys to engage by frictional contact, as we are enabled to accomplish this result by constructing and combining the pulleys in various ways. Neither do we wish to be confined to any specified number of pulleys, as our improved clutch will of course be advantageous where a single loose pulley is used; or any desired number of loose and tight pulleys may be used, and they may be located on the shaft in any desired manner. Also, the style of lever shown and the method of attaching it to the shaft are not material, as they may be varied considerably without departing from the spirit of our invention.

Having thus described our invention, what we claim as new, and desire to secure by Letters Patent, is—

1. In a friction-clutch, a shaft capable of a longitudinal movement in its bearings, and having arranged thereon tight and loose pulleys, and adapted to be thrown into engagement by frictional contact, and a worm which engages with a gear-wheel secured on a primary shaft, in combination with a lever attached to said shaft, and operating to effect an initial engagement between the tight and loose pulleys, substantially as set forth.

2. In a friction-clutch, a shaft capable of a longitudinal movement within its bearings, and having rigidly mounted thereon a worm and one or more pulleys, in combination with a gear-wheel adapted to engage with said worm, loose pulleys arranged in close proximity to the tight pulley, and adapted to transmit motion thereto by frictional contact, and a lever attached to said shaft and operating to effect the initial engagement of said pulleys, substantially as shown and described.

3. In a friction-clutch, the combination, with loose and tight pulleys adapted to engage by frictional contact, and arranged on a shaft capable of a longitudinal movement in its bearings, of a worm secured on said shaft and engaging with a gear-wheel mounted on a primary shaft, substantially as set forth.

4. In a friction-clutch, the combination, with a worm secured on a shaft capable of longitudinal movement within its bearings, said worm adapted to engage with a gear-wheel secured on a primary shaft, of one or more loose and tight pulleys adapted to engage by frictional contact and mounted on the same shaft with said worm, whereby the frictional contact between said pulleys may be sustained by the end-thrust of the worm, substantially as shown and specified.

In testimony whereof we affix our signatures in presence of two witnesses.

EDWARD P. WALTER.
HENRY C. WALTER.

Witnesses:
S. S. WILLIAMSON,
H. T. STEPHENS.